United States Patent
Korndoerfer

(10) Patent No.: US 9,030,677 B2
(45) Date of Patent: May 12, 2015

(54) AUTOMATIC ENVIRONMENTALLY FRIENDLY FONT SUBSTITUTION USING PRINT CONTROL POLICIES AND GOVERNANCE LOGS

(75) Inventor: Stephen Kyle Korndoerfer, West Henrietta, NY (US)

(73) Assignee: Xerox Corporation, Norwalk, CT (US)

( * ) Notice: Subject to any disclaimer, the term of this patent is extended or adjusted under 35 U.S.C. 154(b) by 1189 days.

(21) Appl. No.: 12/614,117

(22) Filed: Nov. 6, 2009

(65) Prior Publication Data

US 2011/0109929 A1    May 12, 2011

(51) Int. Cl.
G06F 15/00 (2006.01)
G06K 1/00 (2006.01)
G06K 15/02 (2006.01)
G06F 3/12 (2006.01)

(52) U.S. Cl.
CPC .................................. G06K 15/1823 (2013.01)

(58) Field of Classification Search
None
See application file for complete search history.

(56) References Cited

U.S. PATENT DOCUMENTS

| 6,738,149 | B2 * | 5/2004 | Watanabe | 358/1.11 |
| 2004/0051893 | A1 * | 3/2004 | Yoshida | 358/1.11 |
| 2005/0190408 | A1 * | 9/2005 | Vittitoe | 358/3.06 |
| 2006/0126133 | A1 * | 6/2006 | Marquez | 358/504 |
| 2006/0238792 | A1 * | 10/2006 | Chang et al. | 358/1.13 |
| 2007/0039504 | A1 * | 2/2007 | Edwards et al. | 101/484 |
| 2007/0171446 | A1 * | 7/2007 | Yamamoto et al. | 358/1.11 |
| 2008/0100624 | A1 * | 5/2008 | Matsunaga | 345/469.1 |

OTHER PUBLICATIONS

Fox News, Dutch Company's 'Ecofont' Saves Printer Ink, Dec. 22, 2008.*

* cited by examiner

*Primary Examiner* — Ming Hon
(74) *Attorney, Agent, or Firm* — Richard H. Krukar; Kermit D. Lopez; Luis M. Ortiz

(57) ABSTRACT

A method and a system are disclosed for the automatic substitution of font with a toner saving font. Dynamic substitution of document specified fonts with a toner saving font can reduce the amount of toner used and minimize system resource usage that can slow printing speeds. Substitution software first determines whether a document print request matches a set of predefined conditions. If the document print request does not match all of the conditions, the inquiry ends. Substitution software then determines whether font substitution is selected or mandated at any level of print control. Where a document print request matches all of the predefined conditions and where font substitution is selected or mandated at any level of print controls, the substitution software performs a font substitution to replace original font with a toner saving font.

15 Claims, 3 Drawing Sheets

AUTOMATIC ENVIRONMENTALLY FRIENDLY FONT SUBSTITUTION USING PRINT CONTROL POLICIES AND GOVERNANCE LOGS

TECHNICAL FIELD

Embodiments are generally related to print controls and print governance for the automatic substitution of font. Embodiments are also related to substitution of font with environmentally friendly font in order to reduce toner usage.

BACKGROUND OF THE INVENTION

Reducing materials utilized during printing is not only economically beneficial, but can also benefit the environment. Current print control policies can enforce environmentally friendly, as well as cost saving, rules on end users when they print their documents by suggesting (or enforcing) printing on both sides of the paper when the document is larger than a specified number of pages. While reducing the use of paper can result in large cost savings, it is not the most expensive component involved in the printing process. Toner is far more expensive than paper and anything that effectively reduces the amount of toner used without affecting output quality can result in substantial savings. Traditional methods involve varying the density of the toner applied to the page (e.g. use of "draft" mode), but this often results in the document looking faded or washed out. One such software program is EcoPrint2™ by CoGen Media©.

Alternative approaches to saving toner, such as those described in U.S. Pat. No. 6,791,714 B1, generally involve a post-processing step of analyzing each rendered/rasterized page using an algorithm for determining which pixels can be safely removed without affecting the formatting or layout of the original document. One of the drawbacks of this approach is that, while it does indeed save toner, it usually results in the document looking 'washed out' when color is used or 'grayed out' when black is used. Additionally, because these algorithms are applied to the entire rendered/rasterized page, any images contained within the page are affected as well. Print speeds may also be reduced in this type of post-processing step that is run against each rendered/rasterized page due to increased system resource usage.

Therefore, a need exists for a system and method for reducing toner usage while preserving the quality of the printout and without reducing print speed or affecting print layout.

BRIEF SUMMARY

It is one aspect of the disclosed embodiments to provide for an improved method and system for the automatic substitution of font.

It is another aspect of the disclosed embodiments to provide for an improved method of substituting original font with a toner saving font in order to reduce toner usage.

It is yet another aspect of the disclosed embodiments to provide for substitution software configured to determine whether a document print request matches a set of predefined conditions and whether font substitution is selected/mandated at any level of print control.

It is a further aspect of the disclosed embodiments to provide for substitution software being further configured to perform font substitution of a toner saving font when a document print request matches the set of predefined conditions and when font substitution is selected/mandated at any level of print control.

The aforementioned aspects and other objectives and advantages can be achieved as described herein. A method and system are disclosed for the automatic substitution of font with a toner saving font. Substitution software first determines whether a document print request matches a set of predefined conditions and whether font substitution is selected or mandated at any level of print control. Where a document print request matches all of the predefined conditions and where font substitution is selected or mandated at any level of print controls, the substitution software performs a font substitution to replace the original font with a toner saving font.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

It is to be understood by persons of ordinary skill in the art that the following descriptions are provided for purposes of illustration and not for limitation. An artisan understands there are many variations that lie within the spirit of the invention and the scope of the appended claims. Unnecessary detail of known functions and operations may be omitted from the current description so as not to obscure the present invention.

The method disclosed herein proposes substitution software to dynamically substitute document specified fonts with a toner saving font to reduce the amount of toner used and to minimize system resource usage that can slow printing speeds. One method for performing font substitution is disclosed in U.S. Pat. No. 5,167,013, herein incorporated in its entirety. Toner saving fonts may be alternatively available fonts requiring less toner usage than the originally selected font or an "environmentally friendly" font, which is a font that has small holes, or other omissions, of varying sizes placed within the borders of each character in order to reduce the amount of toner needed to render that character. Because the environmentally friendly font is based on the original font used in a document, substitution will not result in any changes to the original document structure or formatting.

Figure 1:
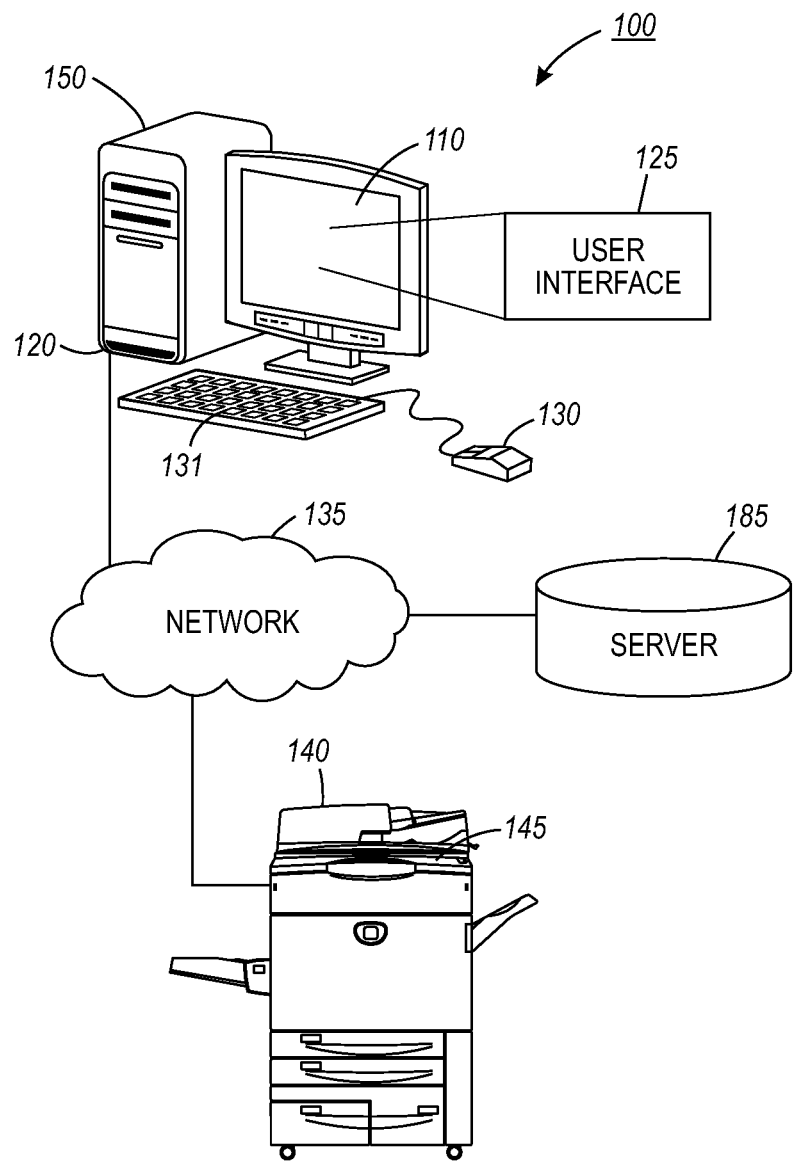
FIG. 1, labeled as "Prior Art", illustrates a system in the context of a data processing apparatus, a server, a network, and a MFD.

Referring to FIG. 1, system 100 includes a multi-function device (MFD) 140 coupled to a data-processing apparatus through a network 135. The data-processing apparatus can be, for example, a personal computer or other computing device and can generally include a central processor 120, a display device 110, a keyboard 131, and a pointing device 130 (e.g., mouse, track ball, pen device, or the like). Additional input/output devices, such as the MFD 140, may be included in association with the data-processing apparatus as desired.

Note that as utilized herein, the term multi-function device (including the acronym MFD) may refer to an apparatus or system such as a printer, scanner, fax machine, copy machine, etc., and/or a combination thereof. Preferably, MFD 140 is capable of multiple rendering functions such as printing, copying, scanning, faxing, etc. In some embodiments, MFD 140 may be implemented with a single rendering function such as printing. In other embodiments, MFD 140 can be configured to provide multiple rendering functions such as scanning, faxing, printing, and copying and can be connected to a network. MFD 140 also generally includes a controller (not shown) for loading files from networked sources and processing files to be rendered.

The data-processing apparatus can be coupled to the MFD 140 through a computer network 135. Network 135 may employ any network topology, transmission medium, or network protocol such as, for example, a computer network, Ethernet, Internet, Intranet, etc. Network 135 may include connections such as wire, wireless communication links, or fiber optic cables. The data-processing apparatus includes a graphical user interface (GUI) 125 that displays information and receives data through the display device 110 and/or the keyboard/mouse 131/130 combination. The data-processing apparatus can be, for example, any computing device capable of being integrated within a network such as a PDA, personal computer, cellular telephone, point-of-sale terminal, server, etc. Note also that in FIGS. 1-3 herein, identical or similar parts or elements are generally indicated by identical reference numerals.

A MFD driver program can be installed on the data-processing apparatus, or on a server 185, and can reside on the host device's hard drive 150. The MFD driver program may be activated through an application interface so that a user may generate a print job with the MFD driver for processing by the MFD 140. Substitution software (not shown) can be installed on the data-processing apparatus, the server 185 or on the MFD 140 itself. The functions of substitution software will be discussed in greater detail below.

The following description is presented with respect to embodiments of the present invention, which can be embodied in the context of a data-processing apparatus, server 185, and MFD 140 depicted in FIG. 1. The present invention, however, is not limited to any particular application or any particular environment. Instead, those skilled in the art will find that the system and methods of the present invention may be advantageously applied to a variety of system and application software, including database management systems, word processors, and the like. Moreover, the present invention may be embodied on a variety of different platforms including Macintosh, UNIX, LINUX, and the like. Therefore, the description of the exemplary embodiments, which follows, is for purposes of illustration and not considered a limitation.

Figure 2:
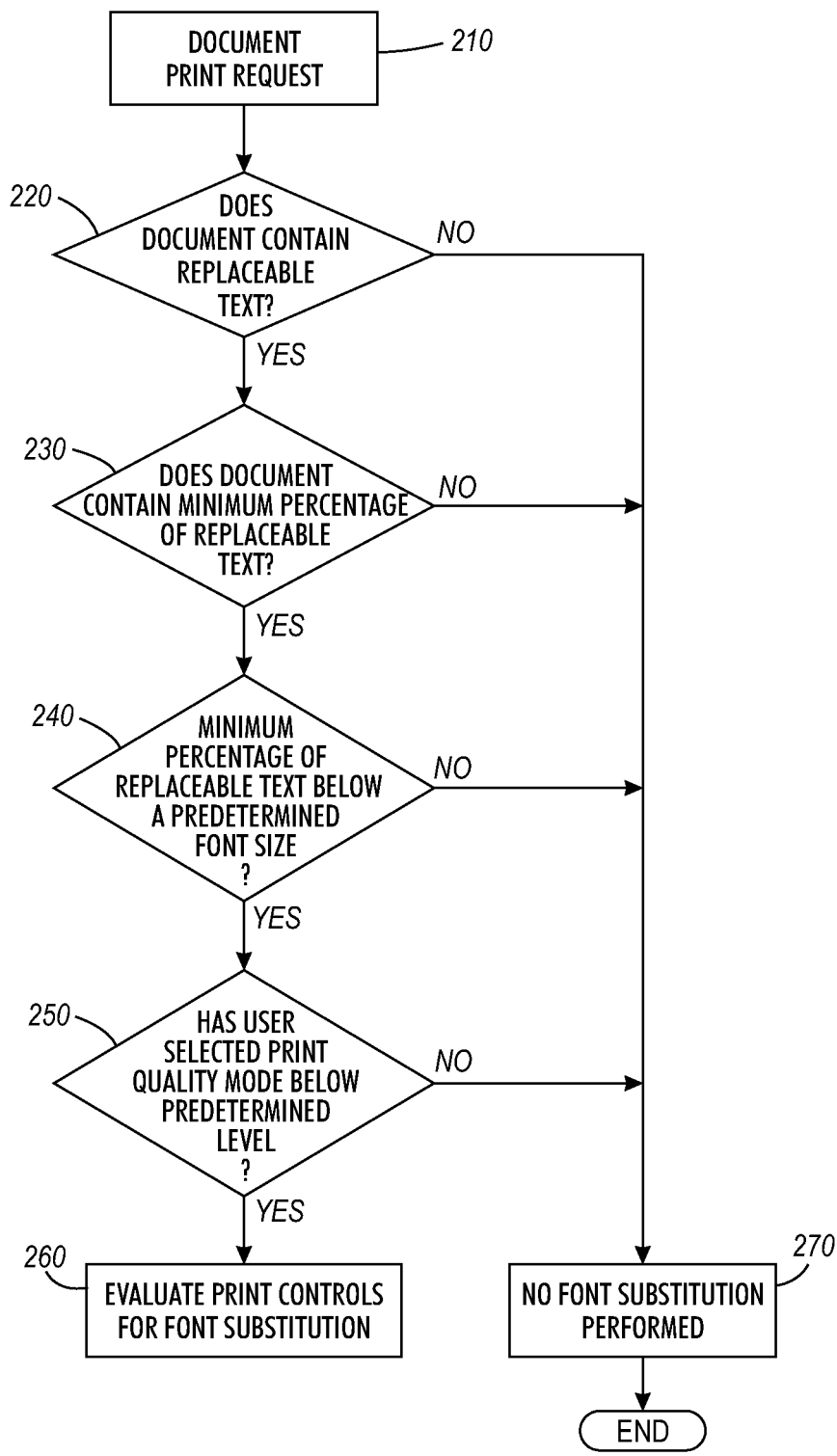
FIG. 2 illustrates a flow chart of a method by which substitution software determines whether a document print request matches a predefined set of conditions related to whether font substitution is appropriate for the document print request, in accordance with the disclosed embodiments.

Referring to FIG. 2, substitution software can be employed to inspect a document print request 210 to determine if the document print request meets certain predefined conditions wherein font substitution would be appropriate and beneficial with respect to reducing toner usage. Font substitution, as used herein, generally refers to the substitution of text originally contained in a document with a toner saving font. Initially, as illustrated in block 220, substitution software evaluates whether the document print request 210 contains replaceable fonts (e.g., does an environmentally friendly version of the original font exist?). Replaceable fonts can also be fonts that require greater toner usage compared to other available fonts (e.g., Arial Black vs. Arial).

If a document print request 210 is found to contain replaceable fonts, substitution software then determines whether there is a minimum percentage of replaceable fonts contained in the document, as indicated in block 230. Block 240 illustrates where a document print request is found to have a minimum percentage of replaceable font, substitution software then determines whether a minimum percentage of the replaceable font is of a particular character size. Environmentally friendly fonts are generally undetectable by the unaided eye at character sizes of 12 points or less. Therefore, substitution of fonts larger than 12 points may result in decreased print quality. If all of the foregoing conditions are present, substitution software then determines whether the user has selected a print mode below a predetermined level, such as "High" or "Presentation", as shown in block 250.

Further referring to FIG. 2, as illustrated in block 270, if any of the aforementioned conditions are not met, substitution software ends the inspection and no font substitution is performed. Alternatively, as shown in block 260, if all of the conditions for font substitution are present, substitution software proceeds to inspecting different levels of the print controls to determine if font substitution is selected or mandated.

Figure 3:
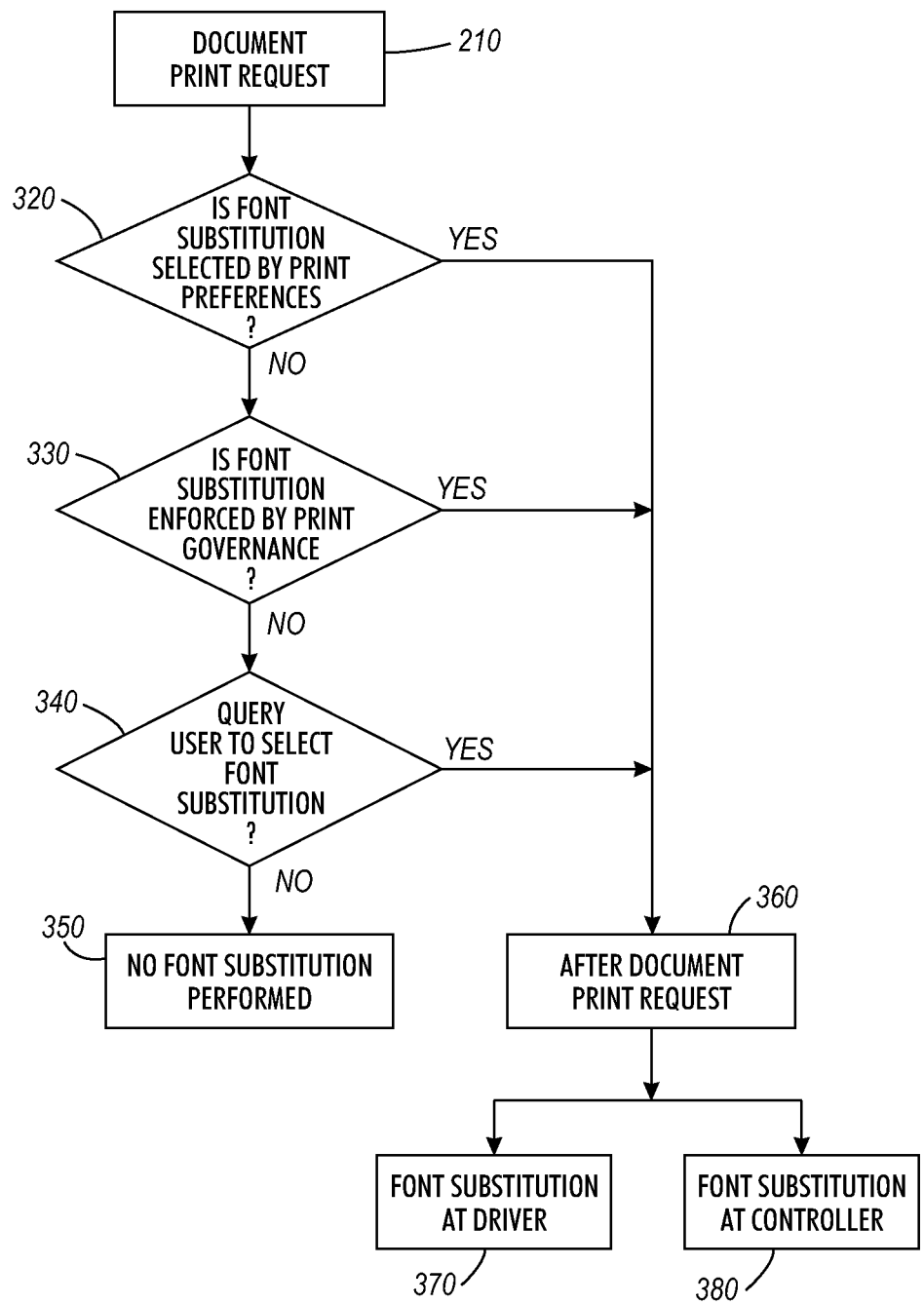
FIG. 3 illustrates a flow chart of the method by which substitution software determines whether font substitution is selected or mandated at any level of print control and whether font substitution will be performed on the document print request, in accordance with the disclosed embodiments.

Referring to FIG. 3, substitution software proceeds, as shown in block 320, to determine whether font substitution has been selected in "print preferences" (i.e. at the MFD driver level). If it is not, substitution software proceeds to determine if font substitution is mandated by print governance tools, as illustrated in block 330. Print governance tools can be put into effect by a system administrator and can be configured to silently apply font substitution across an entire organization or to only certain groups within an organization (e.g. Finance, Engineering, etc.). Print governance tools may also be put into effect for documents originating from a particular program. Where it is found that font substitution is not mandated in print preferences or by print governance tools, substitution software proceeds to query the user if they would like to reduce toner usage, as shown in block 340. If font substitution is selected or mandated at any of the print control levels, the document print request 210 is automatically altered to include a toner saving font call, as illustrated in box 360. Based on the toner saving font call, font substitution can then be performed either at the MFD driver, as shown in block 370, or at the MFD controller prior to rasterizing the document print request 210, as indicated in block 380. Alternatively, as illustrated in block 350, if font substitution is not selected or mandated in at least one print control level, the document print request is not altered and no font substitution is performed. Thus, the document will be rendered as it was originally requested.

In order to assess toner savings and the effectiveness of the policy guiding font substitution, print governance logs can be configured to produce a report showing the amount of toner saved over a certain period of time. This report can also include potential savings if the policy were structured differently. Additional reports can then be produced showing the number of toner cartridges saved, the cost savings associated with the reduced toner usage, and carbon emission reduction, as just a few examples.

What is claimed is:

1. A system for automatic toner saving font substitution with respect to a document, comprising:
   a data processing subsystem, said data processing subsystem creating a print job request corresponding with said document; and a memory in which a plurality of instructions, to be executed with said data processing subsystem, are stored, said instructions including:

determining whether said document contains replaceable text based on whether an environmentally friendly version of the text font is available;

upon a determination that said document contains replaceable text, determining whether said document contains a threshold percentage of replaceable text;

upon a determination that said document contains a threshold percentage of replaceable text, determining whether said document contains a threshold percentage of replaceable text of a predetermined character size;

upon a determination that said document contains a threshold percentage of replaceable text of a predetermined character size, determining whether a print quality below predetermined level is selected for said document;

upon a determination that a print quality below a predetermined level has been selected or mandated for said document, determining if a toner saving font substitution is selected or mandated for said print job request, wherein said toner saving font substitution is performed with a toner saving font; and upon a determination that said toner saving font substitution is selected or mandated for said print job request, altering said print job request so that pursuant to executing said print job request, said toner saving font substitution is performed automatically for said document.

2. The system of claim 1 wherein said toner saving font comprises an environmentally friendly font.

3. The system of claim 1 wherein said toner saving font comprises alternatively available typeface.

4. The system of claim 1 wherein said document further comprises a structure and formatting wherein said structure and formatting are maintained during said font substitution.

5. The system of claim 1 wherein said predetermined character size comprises 12 point or less.

6. The system of claim 1 wherein said toner saving font substitution is mandated by print control governance tools.

7. The system of claim 1 wherein said toner saving font substitution is selectable.

8. A non-transitory computer-usable medium for automatic font substitution, said computer-usable medium embodying computer program code, said computer program code comprising computer executable instructions configured for:

determining whether said document contains replaceable text based on whether an environmentally friendly version of the text font is available;

upon a determination that said document contains replaceable text, determining whether said document contains a threshold percentage of replaceable text;

upon a determination that said document contains a threshold percentage of replaceable text, determining whether said document contains a threshold percentage of replaceable text of a predetermined character size;

upon a determination that said document contains a threshold percentage of replaceable text of a predetermined character size, determining whether a print quality below predetermined level is selected for said document;

upon a determination that a print quality below a predetermined level has been selected or mandated for said document, determining if a toner saving font substitution is selected or mandated for said print job request, wherein said toner saving font substitution is performed with a toner saving font; and upon a determination that said toner saving font substitution is selected or mandated for said print job request, altering said print job request so that pursuant to executing said print job request, said toner saving font substitution is performed automatically for said document.

9. The non-transitory computer-usable medium of claim 8 wherein said predetermined font size comprises 12 point font size.

10. The non-transitory computer-usable medium of claim 8 wherein said toner saving font comprises an environmentally friendly font.

11. The non-transitory computer-usable medium of claim 8 wherein said toner saving font comprises an alternatively available typeface.

12. The non-transitory computer-usable medium of claim 8 wherein said document further comprises a structure and formatting wherein said structure and formatting are maintained during said font substitution.

13. The non-transitory computer-usable medium of claim 8 wherein said font substitution is mandated by print control governance tools.

14. The non-transitory computer-usable medium of claim 8 wherein said font substitution is selectable.

15. The non-transitory computer-usable medium of claim 8 wherein:

said font substitution is mandated by print control governance tools; and said font substitution is selectable.

* * * * *